US005480076A

United States Patent [19]

Siegel et al.

[11] Patent Number: 5,480,076

[45] Date of Patent: Jan. 2, 1996

[54] CLOTHES HANGER WITH RETRACTABLE ARMS

[76] Inventors: Kenneth D. Siegel, 2017 Curtis Ave., #B, Redondo Beach, Calif. 90278; Scott O. Ganaja, 1213 W. Newport St., San Luis Obispo, Calif. 93405

[21] Appl. No.: 411,087

[22] Filed: Mar. 27, 1995

[51] Int. Cl.[6] .......................... A41D 27/22; F16C 11/00; E05F 1/08

[52] U.S. Cl. .............................. 223/94; 223/89; 403/111; 16/307

[58] Field of Search ................................ 223/94, 84, 85, 223/88, 92; D6/315, 324; 403/111; 16/307

[56] References Cited

U.S. PATENT DOCUMENTS

| | | | |
|---|---|---|---|
| 1,384,260 | 7/1921 | Kanter | 16/307 |
| 1,715,590 | 6/1929 | Burhenne | 16/307 |
| 2,123,973 | 7/1938 | Smith | 223/94 |
| 2,425,527 | 8/1947 | Gaudino | 223/94 |
| 3,430,827 | 3/1969 | Nelson | 223/89 |
| 3,538,538 | 11/1970 | Field | 16/307 |
| 4,823,438 | 4/1989 | Roloff | 16/307 |

FOREIGN PATENT DOCUMENTS

| | | | |
|---|---|---|---|
| 629628 | 2/1927 | France | 223/94 |

*Primary Examiner*—C. D. Crowder
*Assistant Examiner*—Bibhu Mohanty
*Attorney, Agent, or Firm*—Albert O. Cota

[57] ABSTRACT

A retractable clothes hanger (10) having a pair of garment support arms that can be positioned in either a normal, extended position or a retracted position. When the arms are retracted, the clothes hanger can be easily inserted and removed from a narrow necked garment such as a turtleneck sweater. The first and second garment support arms are integrally attached to a first and second inner section respectfully with each inner section having a first and second engagement end. The two engagement ends, which are designed to rotatably intermesh, include a plurality of hook bores that when intermeshed, a notch is formed. A hinge spring is then inserted into the notch which normally biases the two garment support arms in their extended position. Into the plurality of bores is inserted the hanger support hook which in addition to functioning as a hanger hook also rotatably secures the two garment support arms. Two push nuts are positioned to secure the hook to the two garment arms.

24 Claims, 4 Drawing Sheets

CLOTHES HANGER WITH RETRACTABLE ARMS

TECHNICAL FIELD

The invention pertains to the general field of clothes hangers and more particularly to an improved clothes hanger that includes a pair of spring-biased retractable arms.

BACKGROUND ART

Conventional clothes hangers are generally designed with a center section having rigid arms that extend outward and are angled downwardly from the center section. Projecting upwardly from the center section is a suspension hook that allows the hanger to be hung from a horizontal pole or other protuberance. In addition to conventional clothes hangers, the prior art also discloses several designs of clothes hangers that have rigid arms that retract inwardly.

The conventional clothes hangers suffice fop hanging most garments that have a large neck opening such as found on front opening coats and shifts However, when a narrow necked garment, such as a pullover buttoned down shirts or turtleneck sweater, is to be hung on a clothes hanger, it is necessary to insert the hanger up through the opening in the lower portion of the garment and into the garment's shoulder section. The retractable arm clothes hanger, when the arms are retracted, is designed to allow the hanger to be easily inserted and removed into the neck opening of a pullover shirt or turtleneck sweater. Once inserted, the arms can be extended into their rigid, outwardly extended position. Thus, preventing unnecessary garment stretching. Retractable arm hangers can also be easily and conveniently stored when not in use.

A search of prior art patents and marketing literature did not disclose any retractable clothes hangers that utilized the spring biased design and overall structure of the applicant's design. However, the following U.S. patents found in the search are considered related.

| U.S. PAT. NO. | INVENTOR | ISSUED | |
|---|---|---|---|
| 4,730,757 | Keller | 15 March | 1988 |
| 4,673,116 | Keller | 16 June | 1987 |
| 4,186,857 | Helms, Jr. | 5 February | 1980 |
| 3,802,610 | Love, et al | 9 April | 1974 |

The U.S. Pat. No. 4,730,757 Keller patent discloses a collapsible clothes hanger. The hanger includes a first arm and a second arm that are pivotally connected by means of a pivot pin, to allow the ends to pivot from an extended to a retracted position. When the arms are extended, they are configured to support an article of clothing. Conversely, when in the retracted position, the clothing can be removed from the hanger or the hanger can be inserted into a garment. The hanger is provided with a supporting hook that allows the hanger to be supported from a clothes rod.

The U.S. Pat. No. 4,673,116 Keller patent discloses a spring-loaded clothes hanger. The hanger includes a first member and a second member. The first member incorporates a supporting hook, a circular hinge section and a first supporting arm. The second member has a second supporting arm and a pivoting axle. The axle extends through the circular section to allow the arms to move downward towards each other and a stop engages the top of the first supporting arm which limits the upward movement of the arms. A spring located between the first and second members urges the two members upwards and away from each other to cause the stop to engage the first which allows a garment to be supported, when the arms are pulled downward, the garment may be pulled off the hanger, The U.S. Pat. No. 4,186,857 Helms, Jr. patent discloses a collapsible coat hanger. The hanger includes a first arm, a second arm and a hook. The hook mutually pivots on a pin so as to rotate relative to one another for folding from an extended portion to a folded, storage position. The first pin engages one of the arms through a slot extending in the arm. The pin and slot combination permits the arms to slide relative to the pin to engage a projection on the arm with an abutment on the other arm, thereby holding the coat hanger in its open position.

The U.S. Pat. No. 3,802,610 Love, et al patent discloses a collapsible garment hanger. The hanger includes a pair of like garment hanger arms that ape pivotally connected by a spindle coupling inserted through their respective coupled ends. The unconnected ends can be collapsed towards each other around the spindle coupling. The stem end of a clothes rod engaging hook is journaled around the spindle between the coupled hanger ends. The spindle also serves as a seat for maintaining a spring that biases the coupled hanger arms towards one another. By twisting the respective unconnected hanger arm ends, against the spring bias, allows the hanger arms to be pivoted back towards one another to collapse the hanger. The collapsed hanger can be inserted into a garment without necessitating stretching the garment. Thereafter, the hanger arms can be pivoted into their extended position.

For background purposes and as indicative of the art to which the invention relates, reference may be made to the following remaining patents found in the search.

| U.S. PAT. NO. | INVENTOR | ISSUED | |
|---|---|---|---|
| 5,344,054 | Nutter | 6 September | 1994 |
| 5,284,260 | Caligiuri, Sr. | 8 February | 1994 |
| 4,997,115 | Jolley | 5 March | 1991 |
| 4,948,019 | Rodum | 14 August | 1990 |
| 4,907,771 | Wang | 13 March | 1990 |
| 4,813,581 | LaMont | 21 March | 1989 |
| 4,673,115 | LaMont | 16 June | 1987 |
| 4,609,132 | Brokenshire | 2 September | 1986 |
| 4,563,373 | Barnett | 7 January | 1986 |
| 4,391,395 | Karner | 5 July | 1983 |
| 4,160,515 | Frei | 10 July | 1979 |
| 4,157,782 | Mainetti | 12 June | 1979 |
| 4,044,928 | Watanabe | 30 August | 1977 |
| 3,952,929 | Horvath | 27 April | 1976 |
| 3,856,190 | Mole | 24 December | 1974 |
| 3,764,019 | Creamer | 9 October | 1973 |
| 3,647,073 | Steiner | 7 March | 1972 |
| 3,632,028 | Fussel | 4 January | 1972 |

DISCLOSURE OF THE INVENTION

The disclosed invention is designed to provide both consumers and commercial users of clothes hangers with a clothes hanger that can be placed in either a retracted position or in a normal, extended position. When in the retracted position, the hanger can be easily inserted and removed through the top of a narrow necked garment, such as a turtle neck sweater, and after it is inserted the hanger can be easily released from its retracted position and into its extended, garment holding position. The retracted hanger, prevents narrow necked garments from being unduly stretched as frequently occurs when using conventional clothes hangers.

In its basic design, the clothes hanger with retractable arms consists of:

1. A first garment support arm comprising:
   a) a first inner section having an inward end and an outward end,
   b) a first engagement end integral with the inward end of the first inner section, and having a pair of hook bores therethrough,
   c) a first elongated section having an inward end that is integrally attached to the outer end of the first inner section. From the inward end, the elongated section has a downward tapering slope that terminates with a narrow end,
2. a second garment support arm comprising:
   a) a second inner section having an inward end and an outer end,
   b) a second engagement end integral with the inward end of the second inner section, and having a pair of hook bores therethrough. The first and second inner sections are designed to swivelly intermesh. When in the intermeshed configuration, the hook bores of the first and second garment support arms are in alignment and a spring slot is formed between the two inner sections,
   c) a second elongated section having an inward end that is integrally attached to the outer end of the second inner section. From the inward end, the elongated section has a downward tapering slope that terminates with a narrow end,
3. a hinge spring having a coil that is sized to be inserted into the spring slot. The spring normally biases the first and second garment support arms in their extended garment holding position, and
4. a hanger support hook that is inserted through the hook bores on the first and second engagement ends and through the spring coil. When inserted, the hook rotatably secures and allows the first and second support arms to remain in their extended position or to be placed in their retracted position.

In addition to the above basic design features, the clothes hanger with retracted arms can also be designed to include a) A pair of notches on the upper surface of the hanger. These notches allow garment straps to be secured;
b) A pair of supplementary, downward extending hooks that can be attached to the bottom surface of the hanger, and
c) A horizontal cross bar that can be removable attached to the inward ends of the garment hanger arms when the hanger is placed in the extended position, In view of the above disclosure, it is the primary object of the invention to produce a clothes hanger with retractable arms that when the arms are retracted, the hanger can be easily and quickly inserted and removed from a narrow necked garment with minimal stretching of the garment.

In addition to the above primary object of the invention it is also an object of the invention to produce a clothes hanger that:

can be easily and securely locked in its retracted position to facilitate transportation and storage, can be easily released from its retracted position and securely locked in the extended position, can be retracted or extended with only one hand while the other hand remains free to hold and position the garment, is reliable and maintenance free, is aesthetically designed, and is cost effective from both a manufacturers an consumers points of view.

These and other objects and advantages of the present invention will become apparent from the subsequent detailed description of the preferred embodiment and the appended claims taken in conjunction with the accompanying drawings.

BEST MODE FOR CARRYING OUT THE INVENTION

Figure 1:
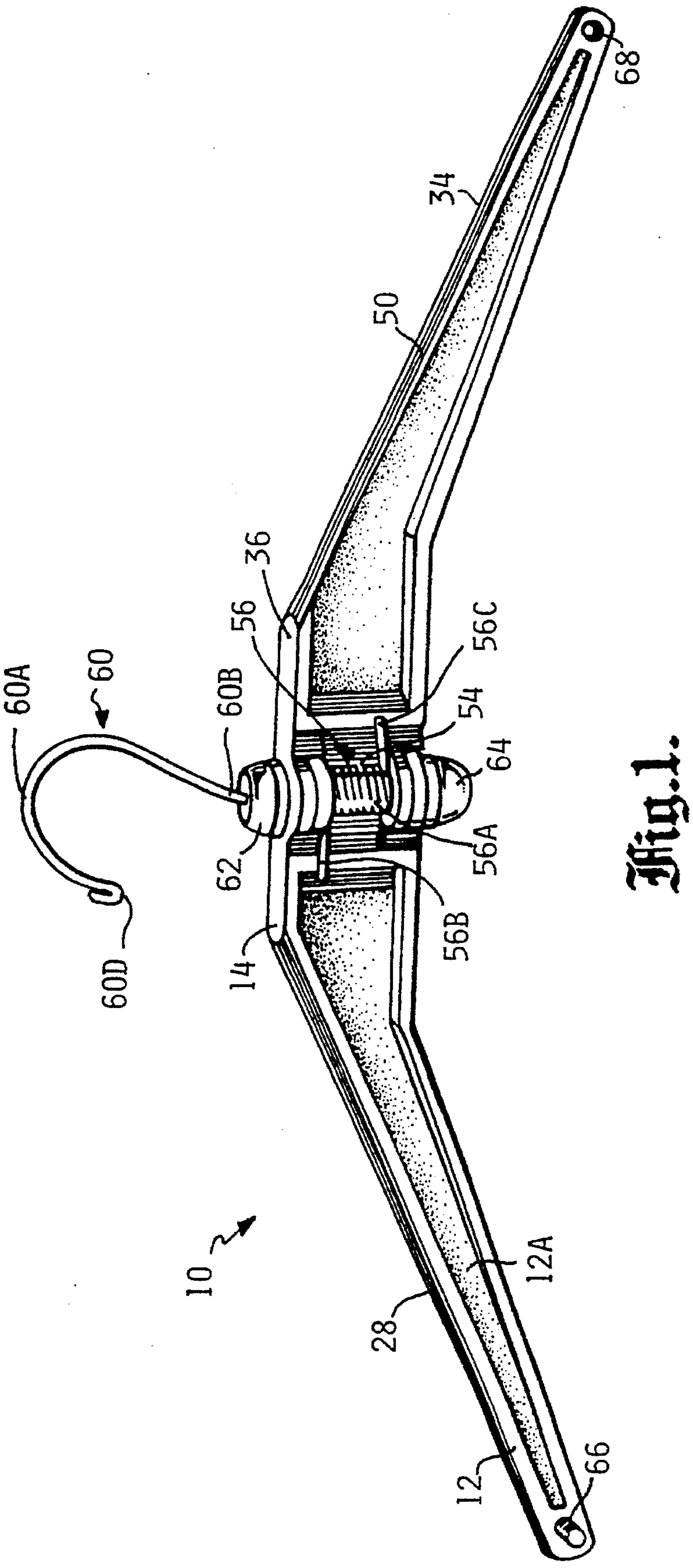
FIG. 1 is a perspective view of the clothes hanger with retractable arms shown in its fully extended position.

The best mode for carrying out the clothes hanger having retractable arms 10 is presented in terms of a preferred embodiment as shown in FIGS. 1–9. The preferred embodiment is comprised of ten major elements: a first garment support arm 12, a first inner section 14, a first engagement end 16, a first elongated section 28, a second garment support arm 34, a second inner section 36, a second engagement end 38, a second elongated section 50, a hinge spring 56 and a hanger support hook 60.

Figure 2:
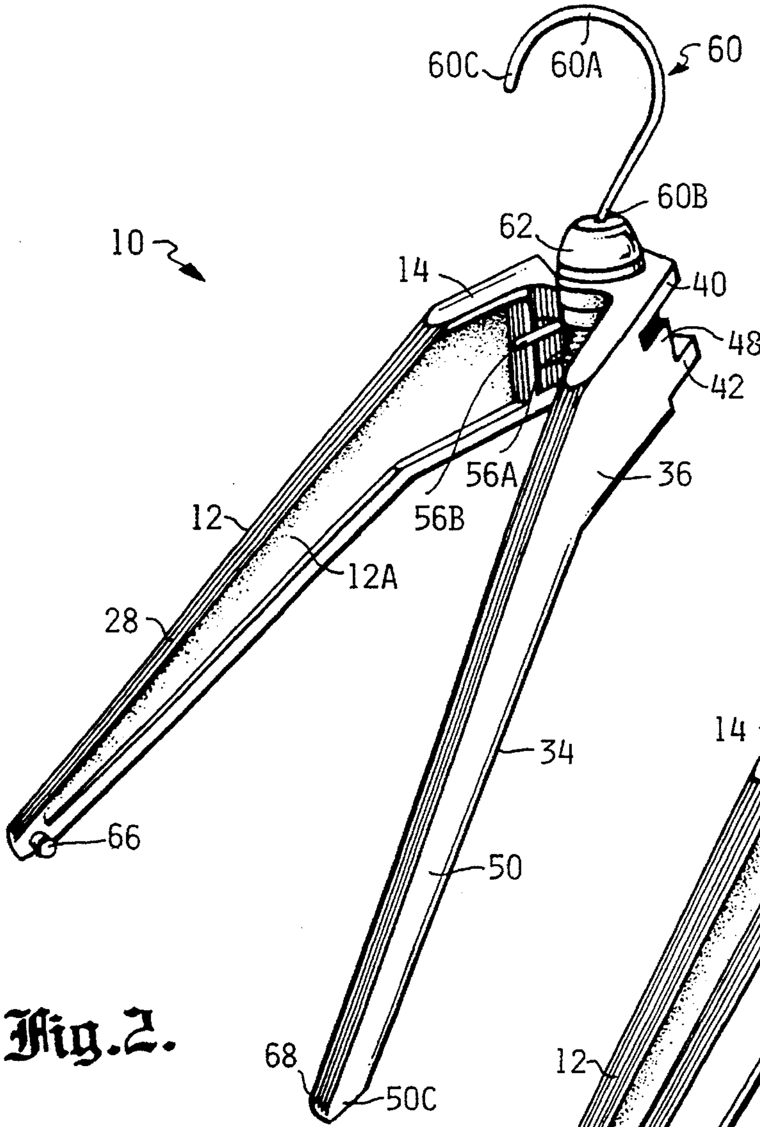
FIG. 2 is a perspective view of the clothes hanger shown partially retracted.
Figure 3:
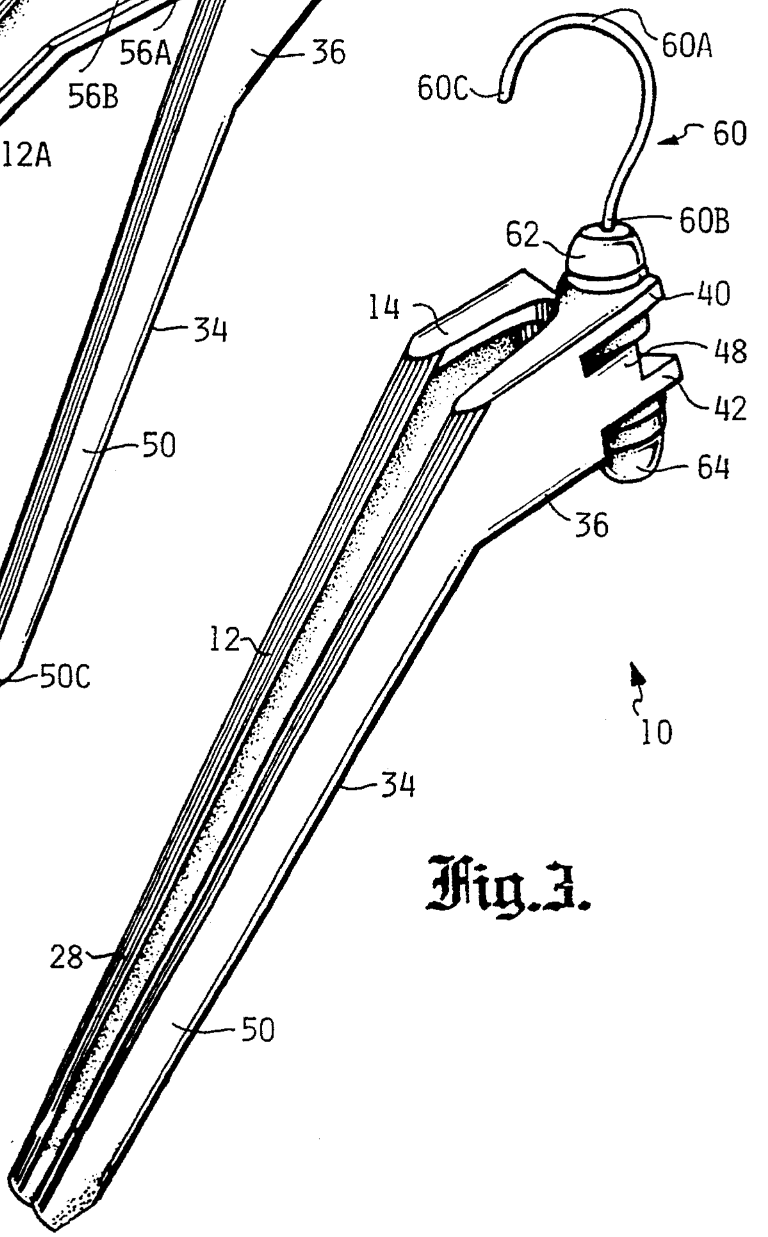
FIG. 3 is a perspective view of the clothes hanger shown in its fully retracted position.

The hanger 10 in its fully extended position is shown in FIG. 1, partially retracted in FIG. 2 and in its fully retracted position in FIG. 3. When fully extended, the hanger 10 can be conventionally used to hang a garment; when fully retracted, the hanger can be easily inserted and removed from the top of narrow necked garments without undue stretching of the garment.

Figure 5:
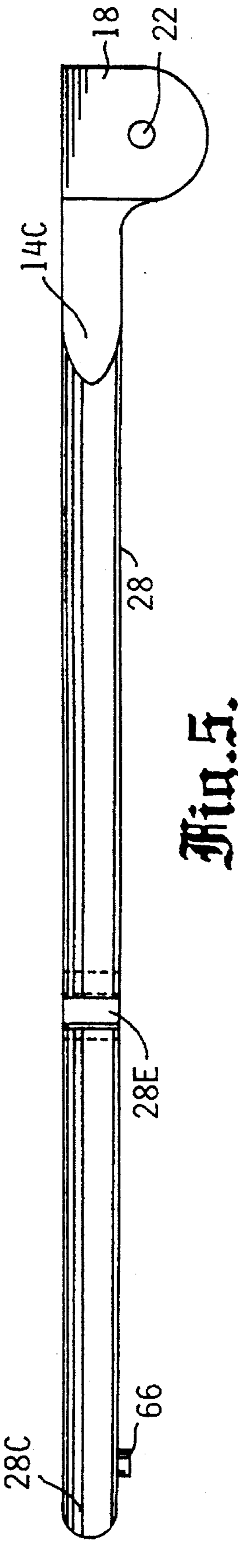
FIG. 5 is a top plan view of the first garment support arm as shown in FIG. 4.
Figure 4:
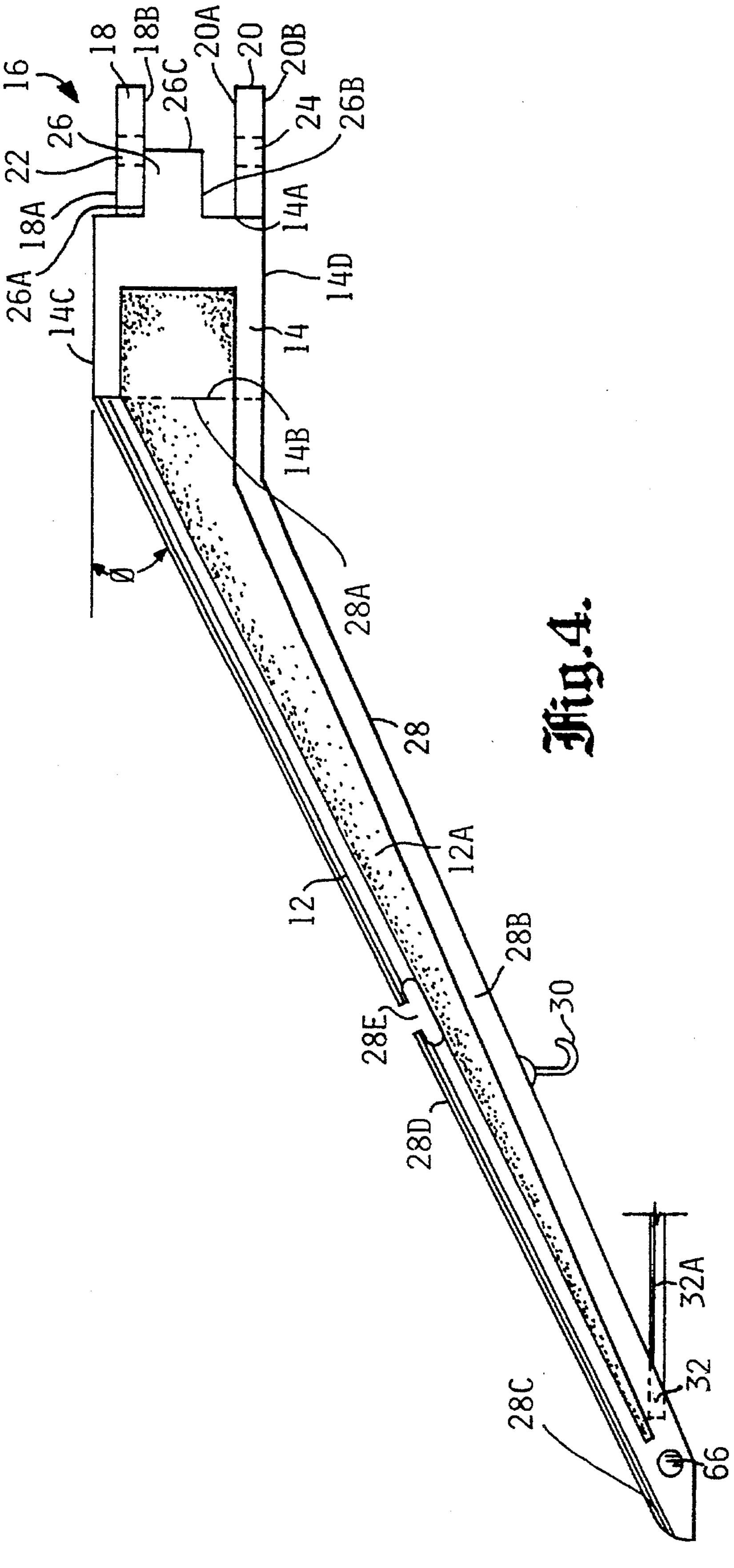
FIG. 4 is an elevational side view of the first garment support arm showing the relative positions of the first inward section and the first elongated section.

The first garment support arm 12 as shown best in FIGS. 1, 4 and 5, consists of a first inner section 14 that includes an inward end 14A, an outward end 14B, and a substantially horizontal upper surface 14C and horizontal lower surface 14D. Integral with the inward end 14A of the first inner surface 14 is a first engagement end 16 that consists of a first upper attachment protrusion 18 and a first lower attachment protrusion 20.

The first upper attachment protrusion 18 as best shown in FIGS. 4 and 5, has an upper surface 18A and a lower surface 18B. The upper surface 18A is spaced below the horizontal upper surface 14C of the first inner section 14.

The first lower attachment protrusion 20 as shown in FIG. 4, is in alignment and is spaced below the first upper attachment protrusion 18. The protrusion 20 also has an upper surface 20A and a lower 20B. The lower surface 20B is flush with the horizontal lower surface 14D of the first inner section 14.

Vertically located through the center of the first upper attachment protrusion 18 is a first hook hope 22 as shown in FIGS. 4 and 5. A second hook bore 24 is vertically located through the center of the first lower attachment protrusion in alignment with the first hook bore 22 as shown in FIG. 4.

The final structural element of the first inner section 14 is a first outward extending stop 26 as shown best in FIG. 4. The stop is integral with the inward end 14A of the first inner section 14, add has an upper surface 26A, a lower surface 26B and a front and 26C. The upper surface of the stop 26 is integral with the lower surface 18B of the first upper attachment protrusion 18; the lower surface above the upper surface 20A of the first lower attachment protrusion; and the front and 26C terminates at a distance equal to the center of the first upper and lower attachment protrusions 18,20.

The first elongated section 28 as shown in FIGS. 1, 4, and 5, includes an inward end 28A that is integrally attached to the outward end 14B of the first inner section 14. The section 28 has a downward tapering slope Ø with a narrow terminating end 28C. The tapering slope Ø may range from 5-degrees to 30 degrees. However, the slope is preferably set at 26 degrees as shown in FIG. 4.

Figures 6, 7, 8, 9, 10:
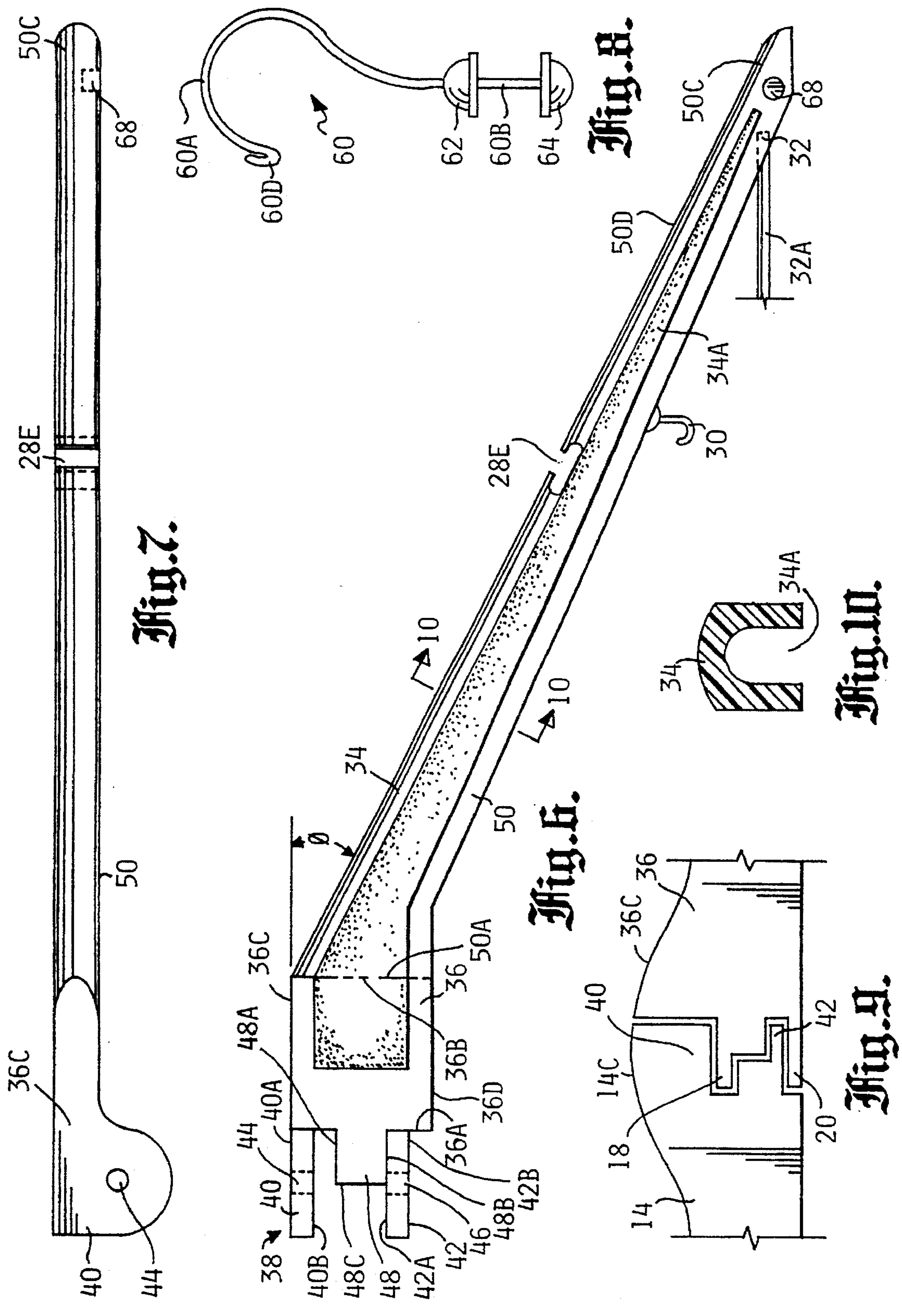
FIG. 6 is an elevational side view of the second garment support arm showing the relative positions of the second inward section and the second elongated section.
FIG. 7 is a top plan view of the second garment support arm as shown in FIG. 6.
FIG. 8 is an elevational side view of the hanger support hook that includes a U-shape terminating end and that shows the relative positions of a first and second push nut that secure the hook.
FIG. 9 is a partial elevational front side view of a first and second inner sections that include a radiused upper surface.
FIG. 10 is a sectional view of an arm having a lower surface into which is formed a recessed area.

The second garment support arm 34 as shown best in FIGS. 1, 6 and 7, consists of a second inner section 36 that includes an inward end 36A, an outward and 36B and a substantially horizontal upper surface 26C and horizontal lower surface 36D. Integral with the inward end 36A of the second inner section 36 is a second engagement end 38. The second engagement end 38 consists of a second upper attachment protrusion 40 and a second lower attachment protrusion 42.

The second upper attachment protrusion 40 as best shown in FIGS. 6 and 7, has an upper surface 40A and a lower surface 40B. The upper surface 40A is flush with the horizontal upper surface 36C of the second inner section 36.

The second lower attachment protrusion 42 as shown in FIG. 6, is in alignment and spaced below the second upper attachment protrusion 40. The protrusion 42 has an upper surface 42A and a lower surface 42B. The lower surface 42B is spaced above the horizontal lower surface 36D of the second inner section 36.

Located through the center of the second upper attachment protrusion 40 is a vertical third hook bore 44 as shown in FIG. 6. A fourth hook bore vertically located through the center of the second lower attachment protrusion 42 in alignment with the third hook bore 44 as shown in FIG. 6.

The final structural element of the second inner section 36, is a second outward extending stop 48 as shown in FIG. 6. The stop is integral with the inward end 36A of the second inner section 36, and has an upper surface 48A, a lower surface 48B and a front end 48C. The upper surface 48A is located below the lower surface 40B of the second upper attachment protrusion 40; the lower surface 48B is integral with the upper surface 42A of the second lower attachment protrusion; and the front end 48C terminates at a distance equal to the center of the second upper and lower attachment protrusions 40,42. The front end 48C is in alignment with the front end 26C of the first outward extending stop 26 and abut each other when the retractable clothes hanger 10 is in the fully extended position as shown in FIG. 1.

The second elongated section 50 as shown in FIGS. 1, 6 and 7, includes an inward end 50A that is integrally attached to the outward end 36B of the second inner section 36. The section 50 has a downward tapering slope Ø with a narrow terminating end 50C. As with the first elongated section 28, the tapering slope is preferably set at 26 degrees as shown in FIG. 6.

The first upper attachment protrusion 18 and the second upper attachment protrusion 40; and the first lower attachment protrusion 20 and the second lower attachment protrusion 40 are designed to rotatably intermesh as shown in FIG. 1. When the protrusions are intermeshed, the first, second, third and fourth hook bores 22,24,44 and 46, are in alignment. Also when intermeshed, a spring slot 54 is formed between the lower surface 48B of the first upper attachment protrusion 18 and the upper surface 42A of the second lower attachment protrusion as shown in FIG. 1.

The first and second garment support arms 12,34 are injection molded of a thermoplastic material that preferably consist of a high-density polyethylene (HDPE). However, a wood or other thermoplastic material may also be used including polystyrene, acrylonitrile butadeine styrene (ABS), polycarbonate, polypropylene, polyvinylchloride (PVC), and nylon. Additionally, the first and second garment support arms may be molded as solid sections or as shown in FIGS. 1, 4 and 6, the arms may be molded with at least one of their sides having an enclosed recessed area 12A, 34A. Alternatively, the lower side of the arms can be molded with a recessed area 12,34A as shown in FIG. 10.

The hanger spring 56 which is preferably made of stainless steel, bas a coil 56A that is dimensioned to fit into the spring slot 54 located between the hook bores as shown in FIG. 1. From one end of the coil 56B extends a first horizontal tension rod 56B and from the other end of the coil extends a second horizontal tension rod 56B. The rods rest against the first and second inner sections 14,36 and bias the first and second garment support arms 12,34 in their extended positions as also shown in FIG. 1. The bias spring tension may be selected to range from 0.5 to 3 in-lbs.

The hanger support hook 60 as shown in FIG. 8, is preferably formed of a hard galvanized rod and has an upper hook section 60A from when extends downward, a vertical section 60B. The vertical section 60B is sized to be rotatably inserted sequentially through the first and second hook bores 22,24, the spring coil 56A and through the third and fourth hook bores 44,46. To rotatably secure the hanger garment hook 60 a first push nut 62 and a second push nut 64 are employed as shown in FIG. 8. The first push nut 62 is inserted into the vertical section 60B at a distance where when the bottom surface of the first push nut rests on the upper surface 40A of the second upper attachment protrusion 40, a length of rod equal to a length of a push nut, protrudes from the lower surface 20B of the first lower attachment protrusion 20. Into the lower hook protrusion is then inserted the second push nut to captively and rotatably secure the hanger support hook 60. In turn, the hook rotatably secures and allows the first and second garment support arms to remain in their extended position, with the aid of the hinge spring 56, or to be placed in their retracted position.

The hanger support hook 60 may have a hook section with a truncated terminating end 60C as shown in FIGS. 2 and 3 or the hook terminating end may be bent over into a U-shape 60D as shown in FIGS. 1 and 8. The upper hook section 60A may also have an alligator clip attached (not shown) that allows the hanger 10 to be clipped to a small diameter horizontal hanging rod. Additionally, the hanger support hook may comprise a means for allowing the hook to automatically be rotated inward and nest between the first and second garment support arms 12,34 when the arms are placed in their retracted position. Conversely, the means would allow the hanger to automatically extend upward when the first and second garment support arms are placed in their extended positions.

The first and second garment support arms 12,34 may also include several enhancements that increase the utility of the invention. In one of the enhancements, the upper surface 28D,50D of the first and second elongated sections 28,50 each have at least one notch 28E as shown in FIGS. 4 and 6, that is used for securing garment straps. From the lower surface 28F,50F of each first and second elongated sections may also be attached, by an attachment means, a supplementary downward extending hook 30 as also shown in FIGS. 4 and 6. Additionally, the lower surface 28F,50F of the first and second elongated sections 28,50 may include near the terminating ends 28C,50C, a cavity 32 therein. Into the two cavities 32 can then be inserted a cross bar 32A when the first and second garment support arms 12,34 are in their extended position as also shown in FIGS. 4 and 6. For securing the retractable clothes hanger 10 in the retracted position, a means may be provided for securing the terminating ends together. The preferred securing means is accomplished as shown in FIGS. 1, 4 and 6, by having a male detent 66 protrude from the inside surface 28C of the terminating end 28C. The inside surface 50G of the terminating end 50C includes a female detent 68. When the two terminating ends are pressed together as shown in FIG. 3, the complimentary detent pair 66,68 secures the two ends together. In the final enhancement, which adds to the aesthetics of the design, the first and second inner sections 14,36 each have on their upper horizontal surfaces 14C,36C a section of a radiused surface as shown in FIG. 9. When the first and second garment arms are extended, the two radiused surfaces interface to produce a continuous radiused surface as also shown in FIG. 9.

While the invention has been described in complete detail and pictorially shown in the accompanying drawings it is not to be limited to such details, since many changes and modifications may be made in the invention without departing from the spirit and scope thereof. Hence, it is described to cover any and all modifications and forms which may come within the language and scope of the appended claims.

We claim:

1. A clothes hanger having retractable arms comprising:

a) a first garment support arm comprising:

(1) a first inner section having an inward end and an outward end, (2) a first engagement end integral with the inward end of said first inner section, and having a pair of hook bores therethrough, (3) a first elongated section having an inward end integrally attached to the outer end of said first inner section and having a downward tapering slope with a narrow terminating end, b) a second garment support arm comprising:

(1) a second inner section having an inward end and an outer end, (2) a second engagement end integral with the inward end of the second inner section, and having a pair of hook bores therethrough, where when said first and second inner sections swivelly intermesh, the hook bores are in alignment and a spring slot is formed, (3) a second elongated section having an inward end integrally attached to the outer end of the second inner section and having a downward tapering slope with a narrow terminating end, c) a hinge spring having a coil that is inserted into the spring slot where said spring normally biases the first and second garment support arms in their extended garment holding position, d) a hanger support hook secured by push nuts that when inserted through the hook bores and the spring slot on said first and second engagement ends, rotatably secures and allows the first and second support arms to remain in their extended position or to be placed in their retracted position and, e) means for securing and positioning said hanger support hook on said first and second engagement ends.

2. The retractable clothes hanger as specified in claim 1 wherein the first inner section has a substantially horizontal upper surface and lower surface.

3. The retractable clothes hanger as specified in claim 2 wherein the first engagement end further comprises:

a) a first upper attachment protrusion having an upper surface and a lower surface, where the upper surface is spaced below the horizontal upper surface of said first inner section, b) a first lower attachment protrusion that is in alignment and spaced below the first upper attachment protrusion and having a upper surface and a lower surface, where the lower surface is flush with the horizontal lower surface of said first inner section, c) a first hook bore vertically located through the center of the upper attachment protrusion, d) a second hook bore vertically located through the center of the lower attachment protrusion in alignment with the first hook bore, and e) a first outward extending stop integral with the front end of the first inner section and having an upper surface, a lower surface, and a front end, where the upper surface is integral with the lower surface of the upper attachment protrusion, the lower surface extends above the upper surface of the lower attachment protrusion, and the front end terminates at the center of the first upper and lower attachment protrusions.

4. The retractable clothes hanger as specified in claim 3 wherein the second engagement end further comprises:

a) a second upper attachment protrusion having an upper surface and a lower surface, where the upper surface is flush with the upper surface of the inner section, b) a second lower attachment protrusion that is in alignment and spaced below the upper attachment protrusion and has an upper surface and a lower surface, where the lower surface is spaced above the lower surface of the inner section, c) a third hook bore vertically located through the center of the upper attachment protrusion, d) a fourth hook bore vertically located through the center of the lower attachment protrusion in alignment with the third hook bore, and e) a second outward extending stop integral with the front end of the second inner section and having an upper surface, a lower surface, and a front end, where the upper surface is located below the lower surface of the second upper attachment protrusion, the lower surface is integral with the upper surface of the second lower attachment protrusion, and the front end terminates at the center of the second upper and lower attachment protrusions in alignment with the front end of the first outward extending stop, where when the first and second upper attachment protrusions and the first and second lower attachment protrusions rotatably intermesh, the first, second, third and fourth hook bores are aligned and a spring slot is formed between the lower surface of the first upper attachment protrusions and the upper surface of the second lower attachment protrusion.

5. The retractable clothes hanger as specified in claim 4 wherein said spring coil further comprises a first horizontal tension rod that extends from one end of the coil and a second horizontal tension rod that extends from the other end of the coil, where the rods rest against said first and second inner sections and biases said first and second garment support arms in their extended position.

6. The retractable clothes hanger as specified in claim 5 wherein said hanger support hook further comprises an upper hook section from where extends downward, a vertical section sized to be rotatably inserted through the first and second hook bores, the spring coil and the third and fourth hook bores.

7. The retractable clothes hanger as specified in claim 6 wherein said hanger support hook is formed of a hard galvanized rod.

8. The retractable clothes hanger as specified in claim 7 wherein the hook terminating and of said hanger support hook is bent over into a U-shape.

9. The retractable clothes hanger as specified in claim 1 wherein said hanger support hook comprises a means for allowing said hook to be rotated inward and nest between said first and second garment support arms when said arms are placed in their retracted position, and to extend upward when said first and second support arms are placed in their extended position.

10. The retractable clothes hanger as specified in claim 6 further comprising an alligator clip attached to the upper end of said hanger support hook.

11. The retractable clothes hanger as specified in claim 1 wherein said means for securing and positioning said hanger support hook on said first and second engagement ends comprises a first push nut inserted into the vertically extending section at a distance where when the bottom surface of the nut rests on the upper surface of the second upper attachment protrusion a length equal to a length of a push nut protrudes from the bottom surface of the first lower attachment protrusion, where into the lower hook protrusion is inserted a second push nut to captively secure the hanger support hook which in turn, rotatably secures and allows the first and second support arms to remain in their extended garment holding position or to be placed in their retracted position.

12. The retractable clothes hanger as specified in claim 2 wherein at least one side of the first and second garment support arms having an enclosed recessed area.

13. The retractable clothes hanger as specified in claim 1 wherein the spring tension of said said spring ranges from 0.5 to 3 in-lbs.

14. The retractable clothes hanger as specified in claim 1 wherein said first and second garment support arms are injected-molded of a thermoplastic material.

15. The retractable clothes hanger as specified in claim 10 wherein said thermoplastic material comprises a high-density polyethylene (HDPE).

16. The retractable clothes hanger as specified in claim 1 wherein said first and second garment support arms are constructed of wood.

17. The retractable clothes hanger as specified in claim 1 wherein the upper surface of said first and second elongated sect ions each having at least one notch that is used for securing garment straps.

18. The retractable clothes hanger as specified in claim 17 wherein from the lower surface of each said first and second elongated sections is attached by an attachment means, a supplementary downward extending hook.

19. The retractable clothes hanger as specified in claim 1 wherein said first and second inner section each have on their upper horizontal surface a section of a radiused surface wherein when said first and second garment arms are extended the two radiused surfaces interface to produce a continuous radiused surface.

20. The retractable clothes hanger as specified in claim 1 wherein the terminating ends of said first and second elongated sections have means for securing the two ends together when said clothes hanger is in the retracted position.

21. The retractable clothes hanger as specified in claim 20 wherein said means for securing the two terminating ends of said first and second elongated section comprises:

a) said first terminating end having an inside surface on which is located a male detent, and b) said second terminating end having an inside surface on which is located a female detent where when the two terminating ends are pressed together, the complimentary detent pair secures the two terminating ends,

22. The retractable clothes hanger as specified in claim 1 wherein the lower surface of said first and second elongated sections having near the terminating end a cavity therein into which can be inserted a cross-bar when said first and second garment support arms are in their extended positions.

23. A clothes hanger having retractable arms comprising:

a) a first garment support arm having:

(1) a first inner section having an inward end, an outward end, and a substantially horizontal upper surface and horizontal lower surface, (2) a first engagement end integral with the inward end of said first inner section and consisting of:

(a) a first upper attachment protrusion having an upper surface and a lower surface, where the upper surface is spaced below the horizontal upper surface of said first inner section, (b) a first lower attachment protrusion that is in alignment and spaced below the first upper attachment protrusion and having an upper surface and a lower surface, where the lower surface is flush with the horizontal lower surface said first inner section, c) a first hook hope vertically located through the center the first upper attachment protrusion, (d) a second hook hope vertically located through the center the first lower attachment protrusion in alignment with the first hook bore, (e) a first outward extending stop integral with the inward end of said first inner section and having an upper surface, a lower surface, and a front end, where the upper surface is integral with the lower surface of the first upper attachment protrusion, the lower surface extends above the upper surface of the first lower attachment protrusion, and the front end terminates at the center of the first upper and lower attachment protrusions, (3) a first elongated section having an inward and integrally attached to the outward end of said first inner section and having a downward tapering slope with a narrow terminating end, b) a second garment support arm having:

(1) a second inner section having a inward end, an outward end, and a substantially horizontal upper surface, and horizontal lower surface, (2) a second engagement end integral with the inward end of said second inner section and consisting of:

(a) a second upper attachment protrusion having an upper surface and a lower surface, where the upper surface is flush with the horizontal upper surface of said second inner section, (b) a second lower attachment protrusion that is in alignment and spaced below the second upper attachment protrusion and has an upper surface and a lower surface, where the lower surface, is spaced above the horizontal lower surface of said second inner section, (c) a third hook bore vertically located through the center of the second upper attachment protrusion, (d) a fourth hook bore vertically located through the center of the second lower attachment protrusion in alignment with the third hook bore, (e) a second outward extending stop integral with the inward end of said second inner section and having an upper surface, a lower surface, and a front end, where the upper surface is located below the lower surface of the second upper attachment protrusion, the lower surface is integral with the upper surface of the second attachment protrusion, and the front end terminates at the center of the second upper and lower attachment protrusions in alignment with the front end of the first outward extending stop, (3) a second elongated section having an inward end integrally attached to the outward end of said second inner section and having a downward tapering slope with a narrow terminating end, where when the first upper attachment protrusion and the second upper attachment protrusion, and the first lower attachment protrusion and the second lower attachment protrusion rotatably intermesh, the first, second, third and fourth hook bores are in alignment and a spring slot is formed between the lower surface of the first upper attachment protrusion and the upper surface of the second lower attachment protrusion, c) a hinge spring having a coil that is dimensioned to fit into the spring slot between the hook bores, where from one and of the coil extends a first horizontal tension rod and from the other end of the coil extends a second horizontal tension rod where the rods rest against said first and second inner sections and biases said first add second garment support arms in their extended position, d) a hanger support hook having an upper hook section from where extends downward, a vertical section sized to be rotatably inserted through the first and second hook bores, the spring coil and through the third and fourth hook bores, and e) a first push nut inserted into the vertical section at a distance where when the bottom surface of the first push nut rests on the upper surface of the second upper attachment protrusion, a length equal to a length of a push nut protrudes from the lower surface of the first lower attachment protrusion, where into the lower hook protrusion is inserted a second push nut to captively secure the hanger support hook which in turn, rotatably secures and allows the first and second garment support arms to remain in their extended garment holding position or to be placed in their retracted position.

24. A clothes hanger having retractable arms comprising:

a) a first garment support arm having a first engagement end further having a pair of hook bores therethrough, b) a second garment support arm having a second engagement end further having a pair of hook bores therethrough, where when said first and second engagement ends swivelly intermesh, the hook bores are in alignment and a spring slot is formed, c) a hinge spring having a coil that is inserted into the spring slot, where said spring normally biases the first and second garment support arms in an extended garment holding position, d) a hanger support hook secured by push nuts that when inserted through the hook bores and the spring slot on said first and second engagement ends, rotatably secures and allows the first and second support arms to remain in their extended position or to be placed in a retracted position and, e) means for securing and positioning said hanger support hook on said first and second engagement ends.

* * * * *